United States Patent
Bischof et al.

(10) Patent No.: US 7,034,502 B2
(45) Date of Patent: Apr. 25, 2006

(54) STABILIZATION OF A VEHICLE NETWORK BY GENERATING SHORT-TERM AVAILABLE POWER

(75) Inventors: Hubert Bischof, Vaihingen/Enz (DE); Guenter Nasswetter, Gomaringén (DE); Helmut Suelzle, Freiberg (DE); Marc Knapp, Erdmannhausen (DE)

(73) Assignee: Robert Bosch GmbH, Stuttgart (DE)

( * ) Notice: Subject to any disclaimer, the term of this patent is extended or adjusted under 35 U.S.C. 154(b) by 48 days.

(21) Appl. No.: 10/399,183

(22) PCT Filed: Jul. 11, 2002

(86) PCT No.: PCT/DE02/02532

§ 371 (c)(1),
(2), (4) Date: Aug. 21, 2003

(87) PCT Pub. No.: WO03/016097

PCT Pub. Date: Feb. 27, 2003

(65) Prior Publication Data

US 2004/0036356 A1 Feb. 26, 2004

(30) Foreign Application Priority Data

Aug. 15, 2001 (DE) .................... 101 38 851
Nov. 13, 2001 (DE) .................... 101 55 670

(51) Int. Cl.
*H02J 7/00* (2006.01)
(52) U.S. Cl. .................................... 320/104
(58) Field of Classification Search ............... 320/104, 320/103; 700/28; 701/29, 115
See application file for complete search history.

(56) References Cited

U.S. PATENT DOCUMENTS

| | | | | |
|---|---|---|---|---|
| 4,564,798 A | * | 1/1986 | Young | 320/103 |
| 5,352,929 A | * | 10/1994 | Kohl et al. | 290/36 R |
| 5,848,366 A | * | 12/1998 | Ueda | 701/36 |
| 5,886,419 A | * | 3/1999 | Saito et al. | 307/10.1 |
| 6,122,576 A | * | 9/2000 | Ries-Muller | 701/29 |
| 6,208,931 B1 | * | 3/2001 | Schoettle et al. | 701/115 |
| 6,218,814 B1 | * | 4/2001 | Kohl et al. | 322/28 |
| 6,429,627 B1 | * | 8/2002 | Koss et al. | 322/27 |
| 6,555,930 B1 | * | 4/2003 | Kohl et al. | 290/40 C |
| 6,718,214 B1 | * | 4/2004 | Schoettle et al. | 700/28 |

FOREIGN PATENT DOCUMENTS

| | | | |
|---|---|---|---|
| DE | 19618882 | * | 11/1997 |
| DE | 199 60 079 | | 6/2000 |
| EP | 1 103 426 | | 5/2001 |

* cited by examiner

Primary Examiner—Pia Tibbits
(74) Attorney, Agent, or Firm—Kenyon & Kenyon

(57) ABSTRACT

A method for stabilizing the voltage in an energy-supply system, particularly in a motor-vehicle electrical system, that is fed by a battery and a generator. If the battery is weak or has completely failed, switching in a new consumer may lead to a voltage dip in the system. To prevent this, it is proposed as a precaution to switch in a consumer not needed at the moment. If, at this point, a new consumer is to be switched in, the consumer switched in as a precaution is automatically disconnected, and the excess energy therefrom is switched over to the new consumer.

11 Claims, 3 Drawing Sheets

STABILIZATION OF A VEHICLE NETWORK BY GENERATING SHORT-TERM AVAILABLE POWER

FIELD OF THE INVENTION

The present invention relates to a method for stabilizing an energy-supply system, particularly a motor-vehicle electrical system according to the preamble of claim 1.

BACKGROUND INFORMATION

As a rule, the energy for motor-vehicle electrical systems is supplied by at least one battery and one generator. Under normal conditions, the battery has a sufficient storage and buffer effect to keep the system voltage stable, that is to say, the battery supplies a newly switched-in consumer with energy in the meantime, until the generator is adjusted to a higher power level.

Increasingly, systems such as electrohydraulic braking systems or electrical power steering, for whose operation a stable electrical energy supply is important, are being used in vehicles. In particular, the functioning of safety-relevant systems must be ensured, and must not be jeopardized, for example, by unacceptable voltage dips. At full operativeness of the battery, sufficient buffer effect is present to meet this requirement.

However, if, for example, the battery is in a discharged state before driving begins, and the vehicle is started by an external starting aid, then the buffer effect of the battery is not sufficient. The same also holds true for a weak or defective battery which is able to provide less reserve power.

If, at this point, an electrical consumer is switched in with pronounced starting current, then, because of the relatively large exciter-circuit time constant (approximately 50–100 ms), the generator is only able to react comparatively slowly, and the vehicle system voltage falls briefly below acceptable values. Control units of safety-relevant systems may also thereby fail for a short time. Using an electrical steering or braking system as an example, this represents a very critical state for the controllability of the vehicle. Therefore, the goal must be to achieve rapid stabilization of the voltage.

From the related art, it is known, when the main battery is weak or has failed, to switch in an auxiliary battery until the main battery has been charged or exchanged. A voltage stabilization from some other quarter is therefore not necessary. On the other hand, an additional buffer battery with monitoring electronics and a switching element must further be provided.

SUMMARY OF THE INVENTION

Therefore, an object of the present invention is to realize a simpler method for stabilizing the vehicle system voltage.

What the present invention accomplishes is to switch in a consumer, not needed at the moment, having sufficiently high electrical power consumption, to thus drive the generator to a higher power level. If, at this point, a further electrical consumer is switched on, e.g. the electrohydraulic braking system is actuated, then the consumer switched in as a precaution is automatically switched off, and the now excess energy is "switched over" to the new consumer.

The consumer switched in as a precaution preferably either switches off automatically (by automatic disconnection) when, upon switching in a new consumer, there is a drop below a predefined voltage limit, or it is switched off by a control unit when the control unit determines, for example, that by switching in a new consumer, there would be a drop below the voltage limit.

According to a first specific embodiment of the present invention, the consumer switched in as a precaution has its own switching device which switches off the consumer when the vehicle system voltage falls below a predefined value.

According to a further specific embodiment of the present invention, the consumer switched in as a precaution is switched off by a central control unit which preferably switches off the consumer immediately prior to or simultaneously with the switching-in of the new consumer.

The consumer switched in as a precaution may be switched in permanently, or may first be switched in by a control device when the battery is weak or no longer functional. To check the working capacity of the battery, a battery-condition detection is preferably provided which is connected to the control device.

If, in the meantime, the consumer switched in as a precaution is needed by the system, (e.g. by the vehicle steering system), instead of this consumer, another unneeded consumer is preferably switched on automatically.

In order not to already produce a voltage dip when switching on a consumer as a precaution, the consumer is switched on stepwise, via a ramp, or something similar (not abruptly).

Suitable consumers having high power consumption are, in particular, heaters, e.g. the rear-window heater or seat heater.

A consumer switched in as a precaution is preferably switched off again when the battery has been re-charged or replaced.

DETAILED DESCRIPTION

Figure 1:
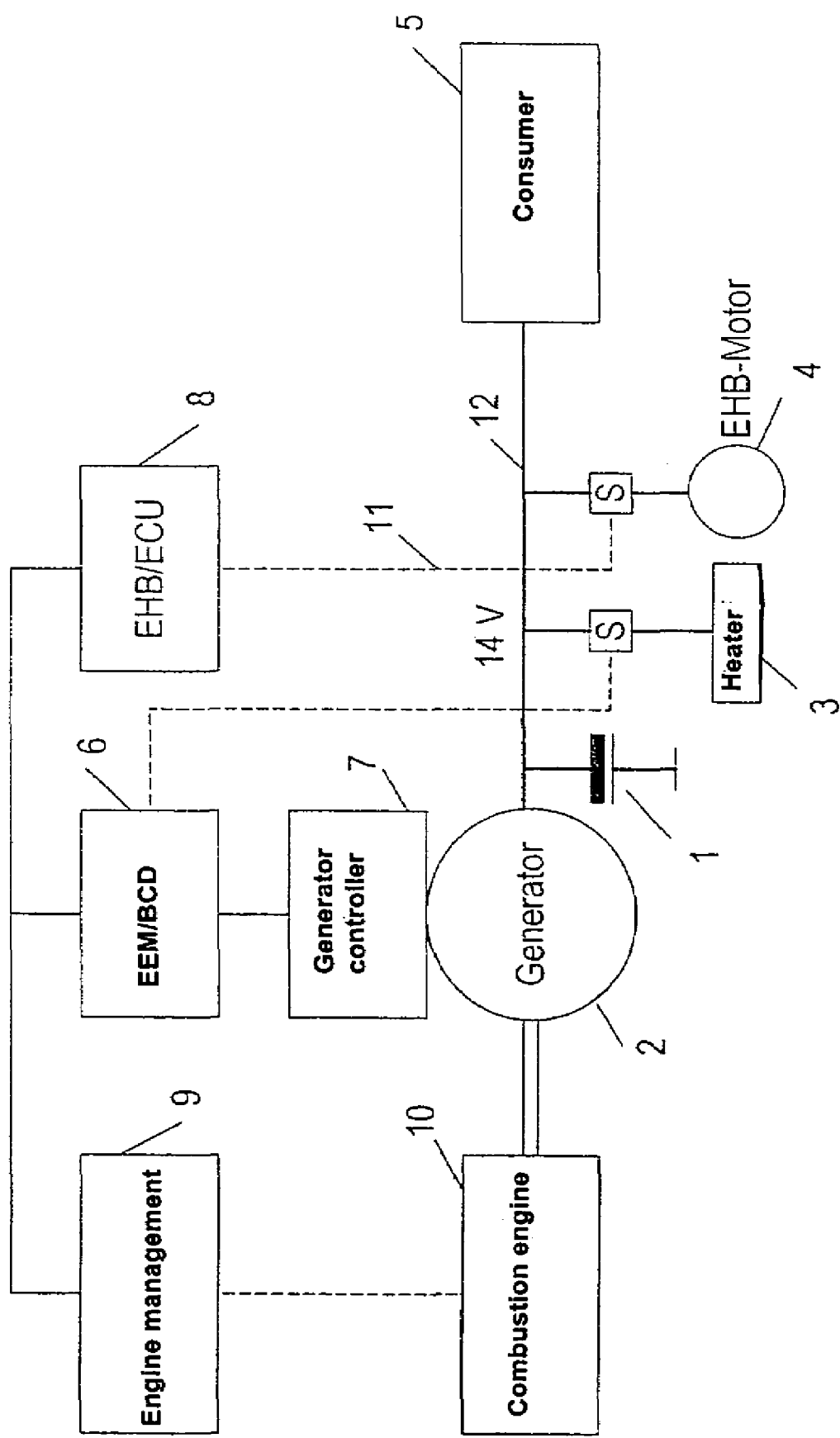
FIG. 1 shows a schematic representation of a motor-vehicle electrical system.

FIG. 1 shows a motor-vehicle electrical system which is fed by a generator 2 and a battery 1.

In the vehicle electrical system, a plurality of consumers are connected, among them being a heater 3, a motor 4 for filling the pressure reservoir of an electrohydraulic braking system, as well as various other consumers 5. As a rule, consumers 5 include interruptible and non-interruptible loads.

Heater 3 and motor 4 for the electrohydraulic braking system (EHB) are provided with a switching device S by which respective consumers 3, 4 may be disconnected. Switching devices S are connected via control lines 11 to their corresponding controls 6, 8 (ECU: electronic control unit).

Control unit 6 assumes the task of an electrical energy management (EEM) and, in response to overloading of the vehicle electrical system, is able to initiate countermeasures by, for example, disconnecting or dimming certain loads.

Control unit 6 is also connected to an engine management 9 for a combustion engine 10, the engine management being driven according to demand.

As already mentioned, if battery 1 is weak or no longer functional, voltage dips may occur in the vehicle electrical system when larger consumers are switched in. Because of this, control unit 6 and electric control unit 8 (ECU: electric control unit) of the electrohydraulic braking system may experience short-term failure. Using an electrical steering system or the electrohydraulic braking system as an example, this represents a very critical state for the controllability of the vehicle. Therefore, for safety-related reasons, the voltage is stabilized rapidly in order to prevent such failures.

Figure 2:
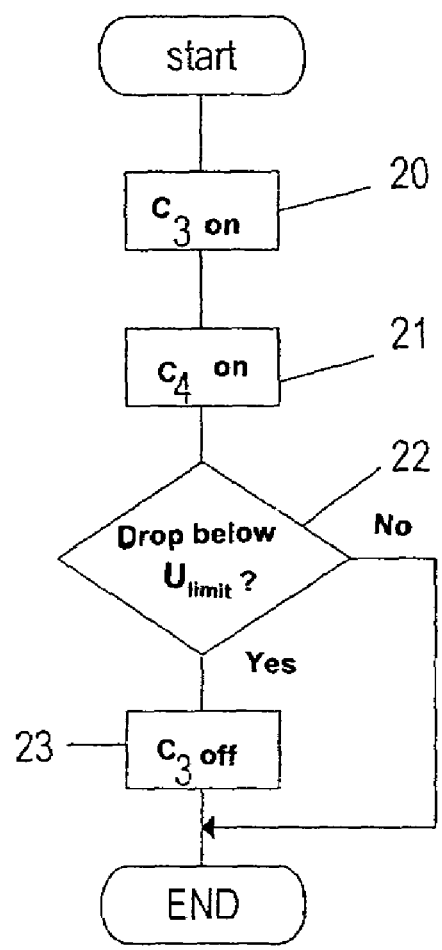
FIG. 2 shows a flowchart of a method for stabilizing the vehicle system voltage according to a first exemplary embodiment of the invention.

One method for stabilizing the vehicle system voltage is shown in FIG. 2. In this context, in step 20, an unneeded consumer with sufficiently high power consumption is switched on (carried out automatically, for example, by control unit 6). The consumer switched in as a precaution may be, for example, a heater 3, particularly a rear-window heater. In this case, the consumer is switched in permanently, regardless of whether or not battery 1 is weak.

In step 21, a consumer is now switched in by a user (for example, the driver switches on the seat heater).

If battery 1 is weak or not functional, this leads to a voltage dip in the vehicle electrical system. If there is a drop below a predefined voltage limit (check in step 22), switching device S of consumer 3, switched in as a precaution, disconnects it automatically (automatic disconnection, step 33).

If, on the other hand, battery 1 is sufficiently strong, it has adequate buffer effect to supply the newly switched-in consumer with the necessary energy. In this case, consumer 3 switched in as a precaution is not disconnected.

Parallel thereto, further measures may be initiated for stabilizing the voltage in the vehicle electrical system. For example, control unit 6 may markedly increase the excitation of generator 2. Other power-increasing measures are likewise conceivable.

Figure 3:
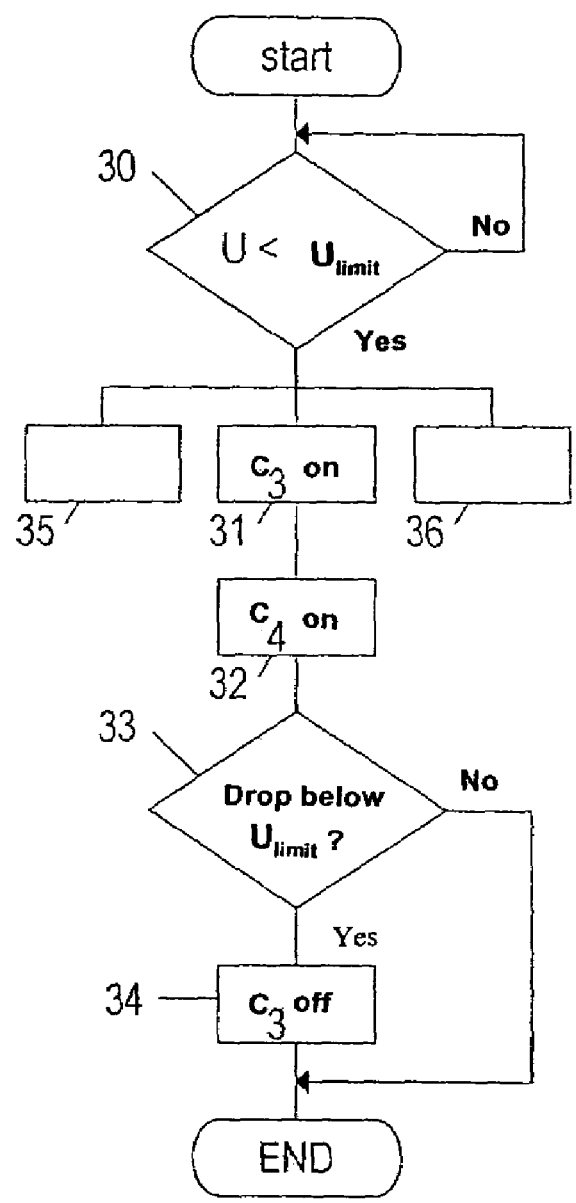
FIG. 3 shows a flowchart of a method for stabilizing the vehicle system voltage according to a second exemplary embodiment of the present invention.

FIG. 3 shows another method for stabilizing the vehicle system voltage, in which an additional consumer is only switched in as a precaution when the battery is weak or has completely failed, so that its working capacity is no longer sufficient to switch in a further consumer without a voltage dip. For assessing the working capacity of battery 1, in this case a battery-condition detection (BCD) is used which, in step 30, determines the working capacity of battery 1. An additional consumer 3 is only switched in as a precaution in step 31 if the check has revealed a weak or non-functional battery.

Parallel to switching in a consumer, control unit 6 may increase the excitation of generator 2 (step 35) or initiate other power-increasing measures (step 36). Steps 32 through 34 correspond to steps 21 through 23 in FIG. 2 and therefore need no further explanation.

The predefined voltage limit, upon whose undershooting switching device S disconnects consumer 3 that had been switched in as a precaution, naturally lies above the failure limit of control unit (ECU) 8 for the electrohydraulic braking system.

Thus, in this method, an additional consumer is only switched in as a precaution if the battery is weak or not functional. Compared to the method of FIG. 2, it is thereby possible to save considerably on energy.

Figure 4:
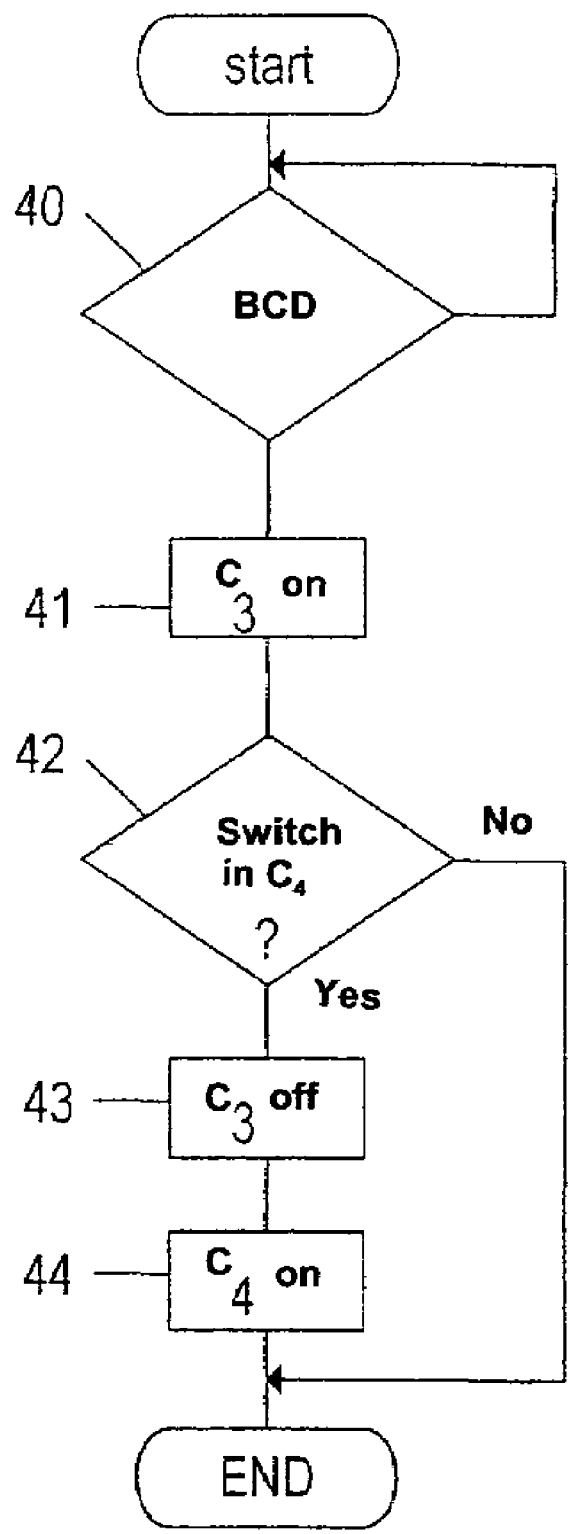
FIG. 4 shows a method for stabilizing the vehicle system voltage according to a third exemplary embodiment of the present invention.

FIG. 4 shows a further method for stabilizing the voltage in a vehicle electrical system. A battery-condition detection is utilized in this method, as well, to assess the working capacity of battery 1 in step 40, and in step 41, to possibly switch in a consumer 3 as a precaution.

If, at this point, a further consumer, e.g. pump motor 4 of the electrohydraulic braking system, should be switched on, this is recognized by control unit 6 which, as a stabilizing measure, in step 43 then switches off consumer 3 which had been switched in as a precaution, and switches in the new consumer in step 44. Consumer 3, switched in as a precaution, is preferably only disconnected when switching in the new consumer would lead to an unacceptable voltage dip.

The precautionary switching-in of consumer 3 in steps 20, 32 and 41, respectively, should be carried out stepwise or via a ramp, in order not to already produce a voltage dip here.

What is claimed is:

1. A method for stabilizing a supply voltage in an energy-supply system that is fed by a battery to which a plurality of consumers are connected and by a generator, the plurality of consumers including a first electrical consumer, the method comprising:

switching on the first electrical consumer as a precautionary measure in order to increase a power supplied by the generator, wherein operation of the first electrical consumer is not needed except for the precautionary measure; and switching off the first electrical consumer when one of: a) the supply voltage falls below a predefined value by switching on a new consumer; and b) the supply voltage is expected to fall below the predefined value by switching on a new consumer.

2. The method as recited in claim 1, wherein:
   the energy-supply system includes a motor-vehicle electrical system.

3. The method as recited in claim 1, further comprising:
   checking a working capacity of the battery in accordance with a battery-condition detection;
   wherein the step of switching on the first electrical consumer as a precautionary measure is performed when the battery is determined to be one of weak and failed.

4. The method as recited in claim 1, wherein:
   the first electrical consumer is switched off by an automatic disconnection.

5. The method as recited in claim 1, wherein:
   the first electrical consumer is switched off by a control unit.

6. The method as recited in claim 1, further comprising:
   switching on a further one of the plurality of consumers as a precaution when the first electrical consumer is switched on by a user.

7. The method as recited in claim 1, wherein:
   the first electrical consumer includes a switching device that automatically disconnects the electrical consumer in response to a drop below a voltage limit.

8. The method as recited in claim 1, wherein:
   the first electrical consumer is a heater.

9. The method as recited in claim 8, wherein:
   the heater includes one of a rear-window heater and a seat heater.

10. The method as recited in claim 1, wherein:
    in addition to the first electrical consumer being switched on as a precaution, further ones of the plurality of consumers are disconnected.

11. The method as recited in claim 5, wherein:
    the control unit disconnects the first electrical consumer and subsequently switches in a further one of the plurality of consumers.

* * * * *